United States Patent [19]

Kaufman

[11] 3,889,349
[45] June 17, 1975

[54] BRAZING METAL ALLOYS
[75] Inventor: Sydney M. Kaufman, Livonia, Mich.
[73] Assignee: Ford Motor Company, Dearborn, Mich.
[22] Filed: June 8, 1973
[21] Appl. No.: 368,394

[52] U.S. Cl. .................. 228/173; 228/193; 228/220; 228/249; 228/263; 75/208 R; 425/78
[51] Int. Cl. .............................................. B22f 3/16
[58] Field of Search ............ 29/497, 494, 501, 503, 29/504, 182.1, 182 R, 182.2, 182.3, 192 R, 192 CP, 191.2, 420, 475, 478, 479; 75/200, 208 R; 425/78

[56] References Cited
UNITED STATES PATENTS

| | | | |
|---|---|---|---|
| 3,138,862 | 6/1964 | Robinson | 29/487 |
| 3,147,089 | 9/1964 | Chyle | 29/198 |
| 3,307,924 | 3/1967 | Michael | 29/182.5 |
| 3,326,678 | 6/1967 | Talmage | 29/182.2 X |
| 3,652,261 | 3/1972 | Taubenblat | 29/182.1 X |
| 3,795,511 | 3/1974 | Nimi et al. | 29/182.2 X |

*Primary Examiner*—Roy Lake
*Assistant Examiner*—Paul A. Bell
*Attorney, Agent, or Firm*—Joseph W. Malleck; Keith L. Zerschling

[57] ABSTRACT

A method of joining compacted powdered parts is disclosed using a relatively low temperature melting infiltrant (such as copper) to reduce internal porosity of the powder parts at least at the bonding margins thereof and in a predetermined unsaturated amount. A higher melting brazing composition (such as high carbon-iron) is used to bond the parts. The weak capillary attraction with high carbon-iron causes preferential infiltration of the powdered parts to a limited degree.

14 Claims, 1 Drawing Figure

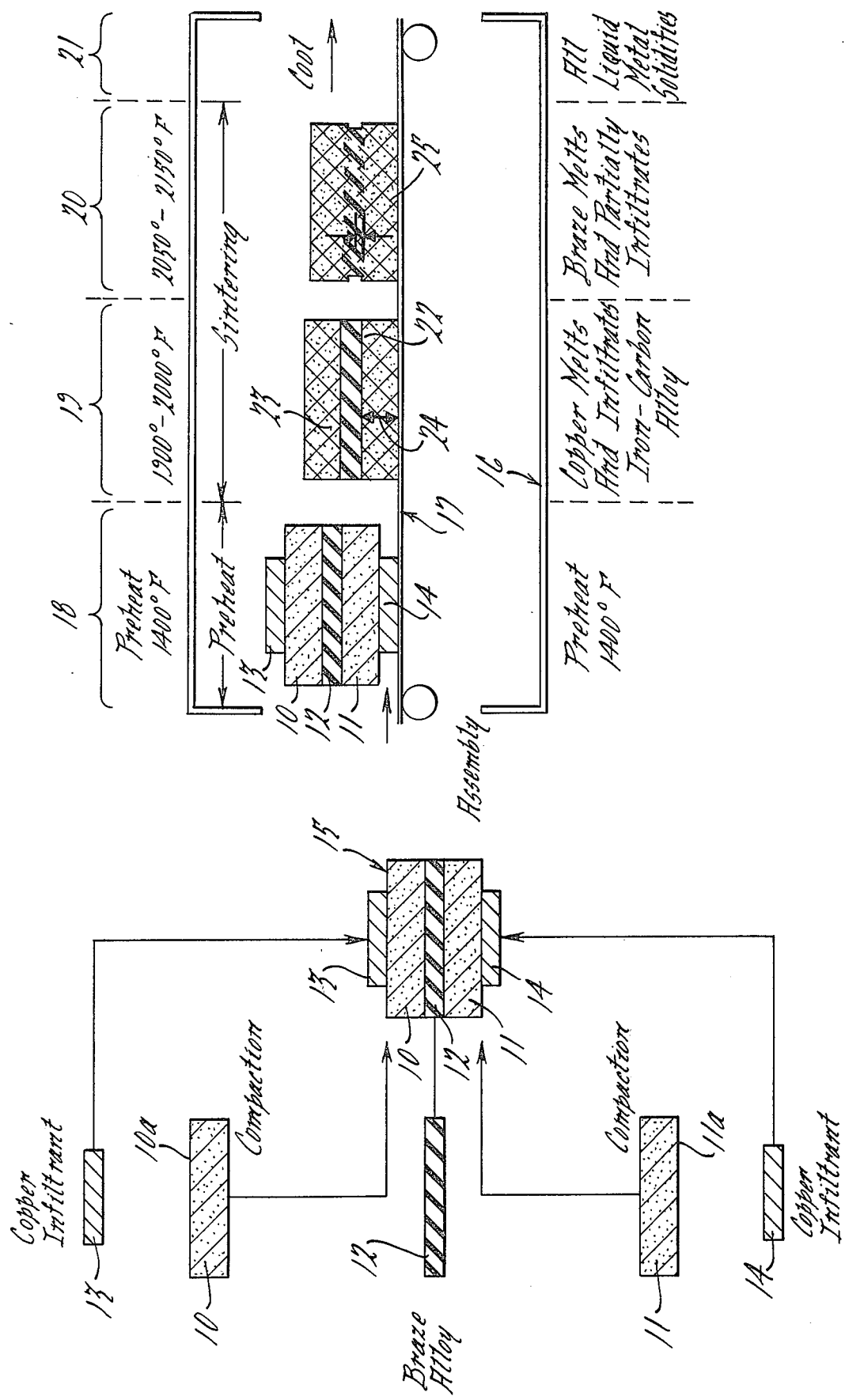

BRAZING METAL ALLOYS

BACKGROUND OF THE INVENTION

Brazing is a difficult process in powder metallurgy. Capillary forces, which normally promote spreading of the brazing liquid on the surface of a pore-free solid will work opposite with powder parts. The liquid will be preferentially absorbed into the pores of the powder metal solid; the internal porosity of powder metal material generates capillary forces which are strong enough to draw liquid away from surfaces to be brazed, similar to the action of an ink blotter. Existing practice requires saturation of these pores before brazing can take place. The fundamental difficulty in requiring saturation, such as by filling, is the problem of determining accurately how much infiltrant is necessary to accomplish the desired task. Too little of the infiltrant will leave residual porosity and the accompanying problem of capillary attraction. Too much infiltrant causes the brazing liquid to exude onto free surfaces of the parts as joined, thereby necessitating subsequent machining or grinding to remove the surface residue.

The saturation technique of closing the pores of a porous ferruginous material is best exemplified in U.S. Pat. No. 3,307,924 in which a copper infiltrating composition is utilized. However, saturation infiltration is performed for the purpose of preventing surface errosion of a powder compact. According to the patent, copper (in the form of a powder) is mixed with the ferruginous powder material, compacted into a body, and finally heated in a conventional manner for promoting infiltration. The resulting mass is a residue which shrinks and warps considerably through coalescence thereby reducing surface contact between the infiltrant and the ferruginous mass. But this art by itself does not teach how one can join such impregnated parts together successfully.

Another independent body of technology has been concerned with the use of high carbon brazing compositions for the purpose of joining solid (pore-free) metals. This is best exemplified in U.S. Pat. Nos. 3,147,089 and 3,138,862. In one patent, a powder graphite-iron mixture (in which the carbon content is greater than the eutectic proportion of carbon in an iron carbon alloy system) is utilized. This type of brazing material is used to provide a resulting joint between solid metal parts characterized by a structural and chemical composition similar to that of the parts being brazed; as a result, electrolytic corrosion in the joint is avoided and the hot strength of the joint is ultimately improved. In the other patent, the brazing composition additionally comprises manganese to promote the capillary action of the brazing alloy and thereby induce it to creep between the roughened surfaces of the solid metal parts to be joined. In this independent technology exemplified by the above patents, no consideration is given to the difficulty of brazing porous powder metal parts utilizing high carbon-iron brazing compositions.

SUMMARY OF THE INVENTION

The primary object of this invention is to provide an improved method for joining powder metal parts with the resulting joint having considerable strength, being resistant to high temperature operation and requiring no machining.

A specific object of this invention is to provide a method whereby the relatively weak capillary attraction between cooper and high carbon-iron compositions is utilized to a selected limited degree to infiltrate the powder parts to be joined so that the brazing compositions effectively operate between the surfaces of the parts.

SUMMARY OF THE DRAWING

FIG. 1 is a schematic layout of a preferred method sequence embodying the principles of this invention.

DETAILED DESCRIPTION

As shown in FIG. 1, a preferred sequence for producing joined powder metal parts comprises initially defining compacted metal portions 10 and 11 which are to be joined. The starting materials may be of any iron base powder having a relatively moderate or low carbon content and preferably constituted of a plain carbon steel powder having a carbon content less than 0.8% by weight. a separate layer 12 of brazing material may be defined by compacting a suitable brazing powder. The brazing powder may be comprised of an alloy consisting of at least 2.03% carbon and the remainder iron. The eutectic temperature of the brazing powder may also be lowered by the addition of manganese to render a brazing compact having 8.5% manganese, 4.0% carbon and the balance iron. The latter alloy melts at approximately 1127°C (2060°F).

A pair of copper infiltrant layers 13 and 14 is also defined from compacted copper particles or from solid copper sheeting.

The defined portions are then assembled together to form a composite 15 for insertion into a sintering furnace 16, the portions 10 and 11 having the brazing layer 12 sandwiched therebetween, the sheeting or compacted layers 13 and 14 of copper infiltrant are placed on the outwardly disposed surfaces 10a and 11a of the metal compacted portions. This interleaved assembly 15, when inserted into the continuous sintering furnace 16, is carried by a continuous belt 17 therein (or a walking beam apparatus as an alternative). The assembly 15 is preferably subjected to a preheat treatment in zone 18 for a period of time between 15 and 20 minutes and at a temperature of approximately 1400°F. In zone 19 of the sintering furnace, the assembly is subjected to a temperature in the range of 1900°–2000°F for a period of time sufficient to allow the copper outer layers 13 and 14 to melt and migrate into the interstices of the iron carbon compacted portions 10 and 11 (such as shown by the double crosshatching to an extent 24) with little or no absorption into the central brazing alloy layer or to the margin 22 and 23 adjacent the brazing layer. In the second stage of sintering or zone 20 of the sintering furnace, the assembly 15 is subjected to a higher temperature in the range of 2050°–2150°F for a period of time sufficient to melt the brazing composition 12 which then proceeds to partially infiltrate the compact powder portions 10 and 11 in the margins or regions 22 and 23 to a thickness 25. The latter two stages of the sintering operation are carried out for a total period of time between 20–32 minutes. The assembly 15 is then allowed to experience a slow cooling sequence in zone 21 of the furnace where the liquidized metal constituents solidify. The total time experienced by the furnace operation will approximate 2 ½ to 3 hours.

The process herein does not require an appreciable degree of pore saturation with liquid before brazing can take place. It takes advantage of the relatively weak capillary forces existing between copper and the high carbon iron brazing material, such as pig iron. In addition, because iron carbon alloys with carbon concentrations in the range of most low alloy steel (0.2 to 1.1% carbon by weight) are readily infiltrated with copper, it is possible therefor to first infiltrate the low carbon iron powder matrix with copper and then braze with high carbon iron without the braze first infiltrating. Indeed, the low carbon iron need not be infiltrated with copper at all since it is only necessary that the inner porosity be coated with copper to reduce capillary forces substantially and thereby sufficient to allow brazing to take place. In those instances where the brazing alloy and infiltrant are prepared separately from the powder matrix, the latter should have a carbon content less than about 1.5%.

The brazing liquid, being a high carbon iron (greater than 2.03%C), melts at temperatures substantially below the melting points of iron or steel. This is due to a eutectic reaction occurring between iron and carbon at concentrations above 2.03% by weight of carbon. This reaction causes initial fusion to occur at 1147°C (2097°F), but complete fusion at this temperature is possible only at a carbon concentration of 4.25%. Slight variations from this eutectic carbon level of 4.25% will cause incomplete fusion and require higher temperatures to complete the melting process. Because of this it is necessary, if temperatures for sintering and simultaneous brazing are kept below 1149°C (2100°F), to stay within plus or minus 0.5% carbon of the eutectic composition.

Because the brazing alloy is high in carbon, the atmosphere used in the process must be kept reducing in character to avoid oxidation of the carbon. Some excesses of carbon may be added initially to compensate for anticipated losses during the sintering processing. Some successful experiments have used about 5% carbon in powder mixture of iron and graphite; the latter brazing alloy melted during sintering at about 1149°C. As indicated earlier, the eutectic temperature may be lowered by the addition of elements such as manganese. The melting reaction however is still based upon the iron-carbon eutectic reaction.

Several alternative variations of the preferred method were carried out by laboratory experimentation. The first series of experiments were performed where brazing and sintering were accomplished simultaneously. The powder metal compacts were comprised of about 0.8% carbon and were previously saturated to varying degrees with copper by conventional techniques; each was subjected to a sintering sequence under a pure hydrogen atmosphere or endothermic generator gas (40% nitrogen, 40% hydrogen, 20% carbon monoxide-Dew point 20°F). The brazing material in the first series of experiments was a high carbon material containing in excess of 2.03%C, such as pig iron (normal blast furnace product) or a mechanical mixture of iron powder and 5% graphite. The third and fourth tests under this series again were similar except that the powder compact was saturated to only 25% and 9%, respectively, with copper. The quality of the brazed joint was good in the first three test cases and was unaffected by the copper percentage, but spill-over became a risk with the 100% saturated matrixes.

A second series of experiments was conducted whereby infiltrating, brazing and sintering were conducted in a continuous operation. The powder matrix was iron and 1% graphite compacted with copper powder. The brazing alloy was again pig iron (greater than 2.03%C) or a mechanical mixture of iron powder with 5% graphite.

A third series of tests varied the manner of introducing the braze material. Under this series, one test consisted of preparing a cast-iron slab to operate as the brazing material and the slab was inserted between the powdered compacted portions to be joined. The powder compacted portions consisted of iron with 0.8% carbon and 9% copper. Another test used a cast-iron powder layer containing copper which was compacted onto both of the surfaces of the metal portions to be brazed together. Another test introduced the variation where the iron powder braze material (admixed with 5% graphite) was compacted in and onto the mating surfaces of both powdered metal portions to be joined together, thereby forming a surface layer to be interengaged when the portions were brought together for brazing. All three techniques under this third series proved feasible, with the quality of the braze being the best for a cast-iron slab or add-on compacted layer. The processing was insensitive to total copper concentration within the range of 9–95%. The brazing alloy must melt above the melting point of copper and below the sintering temperature.

I claim:

1. A method of brazing porous ferruginous material, comprising:
   a. compacting iron base powder to form a pair of mating article portions,
   b. arranging an iron base powder infiltrant having a melting temperature substantially lower than high carbon-iron materials, said arrangement placing said infiltrant adjacent a surface of said article portions,
   c. arranging a brazing material for interconnecting said mating portions, said brazing material having a weaker capillary attraction with said infiltrant than with said iron base powder,
   d. subjecting said contiguously arranged article portions, brazing material and infiltrant to a stepped sintering operation whereby said infiltrant is first permitted to melt and migrate into said article portions in a controlled manner short of said brazing material, said brazing material then melting to infiltrate said article portions only closely adjacent to said mating surfaces thereby providing a durable bond between said article portions on cooling to ambient conditions.

2. The method as in claim 1, in which said iron base powder has a carbon content no greater than 1.5%.

3. The method as in claim 1, in which said brazing material is an iron based composition having a carbon content greater than 2.03%.

4. The method as in claim 1, in which said infiltrant contains copper.

5. The method as in claim 1, in which said brazing material is an iron base material having a carbon content effective to cause a eutectic reaction at temperature levels below the melting temperature of the iron base powder and above that of the infiltrant.

6. The method as in claim 1, in which said brazing material consists of iron and about 5% graphite, the stepped sintering operation being carried out in a reducing atmosphere.

7. The method as in claim 6, in which the atmosphere is non-oxidizing and may consist of either pure hydrogen or generator gas comprised of about 40% nitrogen, 40% hydrogen and 20% carbon monoxide.

8. The method as in claim 5, in which said brazing material is an alloy consisting of about 8.5% manganese, 4.0% carbon and the balance iron.

9. The method as in claim 1, in which said infiltrant is melted to occupy between 9–95% of the porosity of the particle portions.

10. The method as in claim 1, in which the infiltrant is formed as powder compact arranged along the outer sides of the mated portions.

11. The method as in claim 1, in which the infiltrant is added as a constituent powder to the powder mixture for making the particle portions.

12. The method as in claim 1, in which the brazing material is prepared as a solid slab for arrangement between the particle portions during stepped sintering.

13. The method as in claim 1, in which the brazing material is prepared as a powder additive only to the outermost margins of the particle portions during compaction.

14. The method as in claim 1, in which the brazing material is a powder admixed with about 5% graphite and independently compacted onto the mating surfaces of said particle portions.

* * * * *